(12) United States Patent
Engstrom et al.

(10) Patent No.: US 6,247,042 B1
(45) Date of Patent: *Jun. 12, 2001

(54) METHOD AND SYSTEM FOR RESTORING THE STATE OF PHYSICAL MEMORY AS THE FOCUS CHANGES AMONG APPLICATION PROGRAMS IN A COMPUTER

(75) Inventors: G. Eric Engstrom; Craig G. Eisler, both of Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/936,358

(22) Filed: Sep. 24, 1997

(51) Int. Cl.[7] .................................................. G06F 9/00

(52) U.S. Cl. ............................................ 709/107; 711/202

(58) Field of Search .................................. 709/100, 101, 709/102, 105, 106, 107; 711/130, 133, 117, 206, 165, 202, 13, 129, 209; 714/42, 38, 718

(56) References Cited

U.S. PATENT DOCUMENTS

| | | |
|---|---|---|
| 4,688,167 | 8/1987 | Agarwal . |
| 4,967,353 | 10/1990 | Brenner et al. . |
| 5,125,086 | 6/1992 | Perazzoli, Jr. . |
| 5,386,536 | 1/1995 | Courts et al. ........................ 711/136 |
| 5,394,537 | 2/1995 | Courts et al. ........................ 711/202 |
| 5,499,354 | 3/1996 | Aschoff et al. ....................... 711/129 |
| 5,572,694 | 11/1996 | Uchino ..................................... 709/1 |
| 5,606,685 | 2/1997 | Frandeen .............................. 711/117 |
| 5,611,064 | 3/1997 | Maund et al. ........................ 711/209 |
| 5,630,097 | * 5/1997 | Orbits et al. ........................... 395/492 |
| 5,727,178 | 3/1998 | Pletcher et al. ...................... 711/202 |
| 6,078,942 | * 6/2000 | Eisler et al. .......................... 709/100 |

FOREIGN PATENT DOCUMENTS

| | | |
|---|---|---|
| 620 523 A2 | 10/1994 | (EP) . |
| 620 523 A3 | 10/1994 | (EP) . |
| 713 176 A2 | 5/1996 | (EP) . |
| 713 176 A3 | 5/1996 | (EP) . |

OTHER PUBLICATIONS

PCT/US98/16800—International Search Report, Sep. 12, 1998.

"Method of Extending OS/2's Memory management to Recognize "User Focus"", *IBM Technical Disclosure Bulletin*, vol. 35, No. 1A, Jun. 1992, pp. 470–472.

PCT/US98/16802—International Search Report, Sep. 12, 1998.

V. Sohal, Reliable Memory Management for Real–Time Systems, *Electronic Design*, vol. 44, No. 13, Jun. 1996, pp. 118, 120, 122, 124 XP000625394, see p. 120, right–hand column, line 7–page 124, left–hand column, line 39.

PCT/US98/16800—International Search Report, Jan. 22, 1999.

"Packing Variable–Sized Segments in the Swap File of a Paging–Based Virtual Memory System", *IBM Technical Disclosure Bulletin*, vol. 39, No. 3, Mar. 1996, pp. 301/302 XP000581702.

\* cited by examiner

*Primary Examiner*—Majid Banankhah
(74) *Attorney, Agent, or Firm*—Klarquist, Sparkman, Campbell, Leigh & Whinston, LLP

(57) ABSTRACT

A memory monitor automatically restores the state of physical memory allocation of application programs when they lose and then regain the focus in a multitasking computing environment. The memory monitor monitors the focus of the operating system for changes, such as when the user switches from one application to another. When an application loses the focus, the memory monitor determines and stores the state of physical memory allocation. When the memory monitor detects that the application has re-gained the focus, it re-loads all of the code or data that was in physical memory when the application lost the focus, but had been swapped to secondary storage.

19 Claims, 5 Drawing Sheets

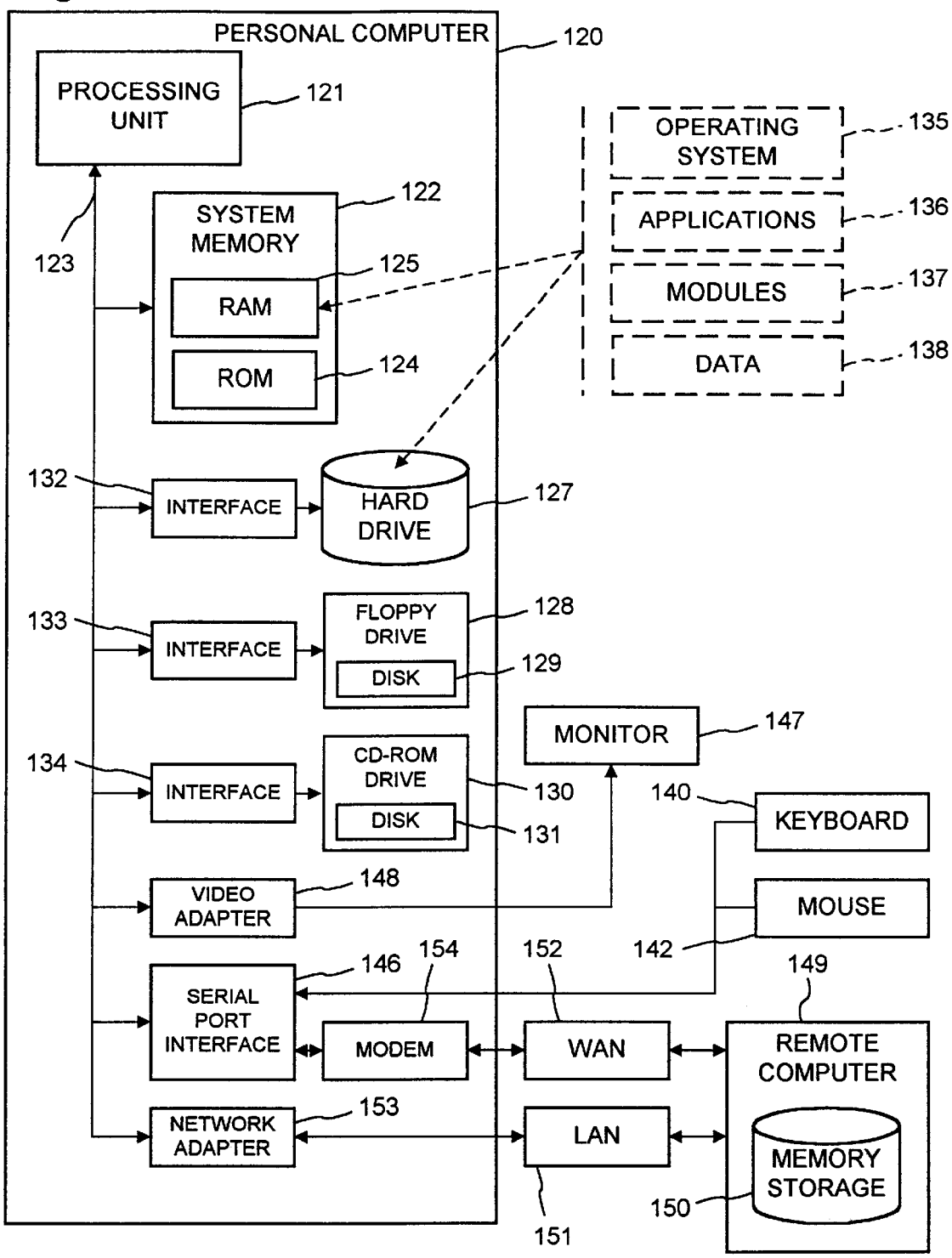

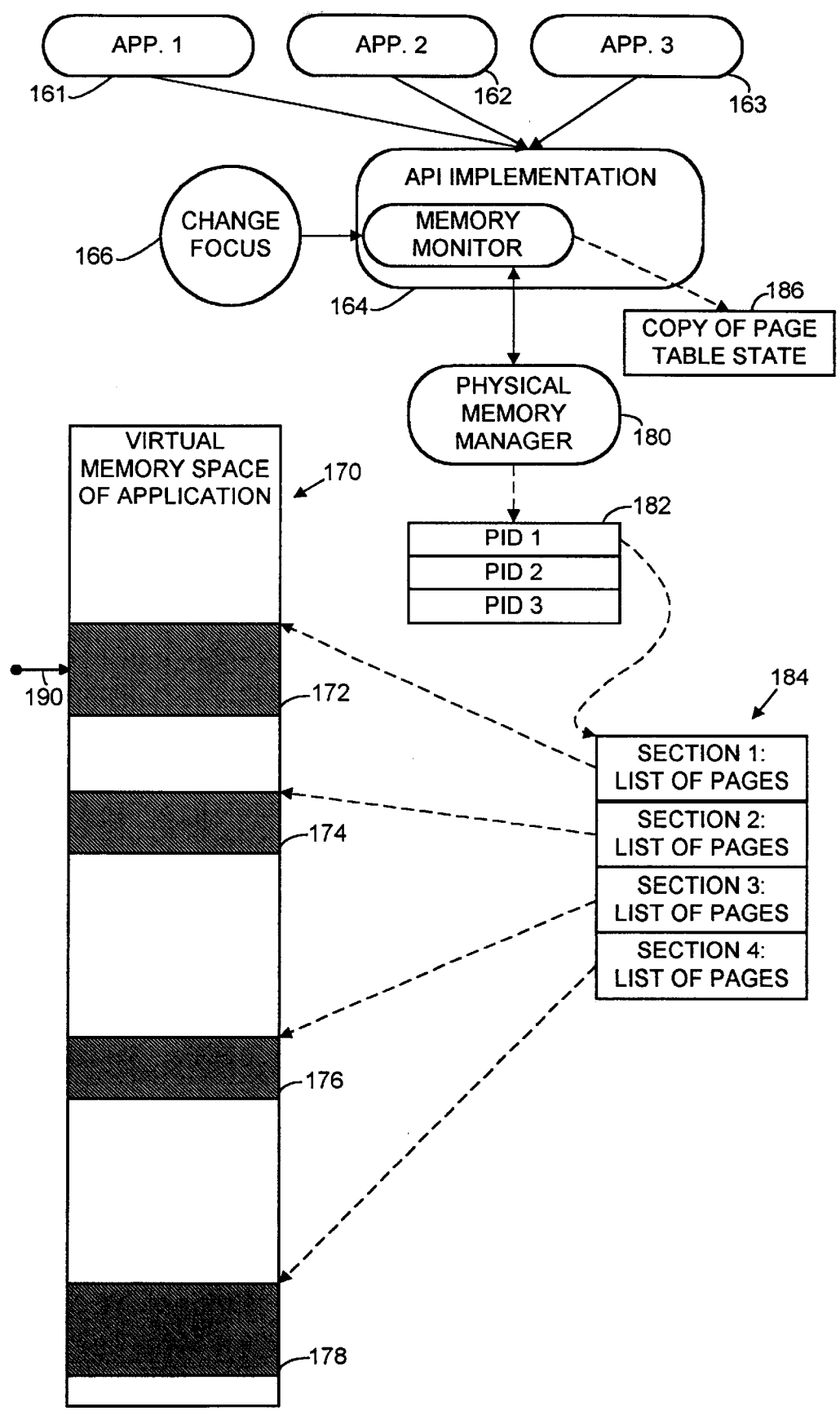

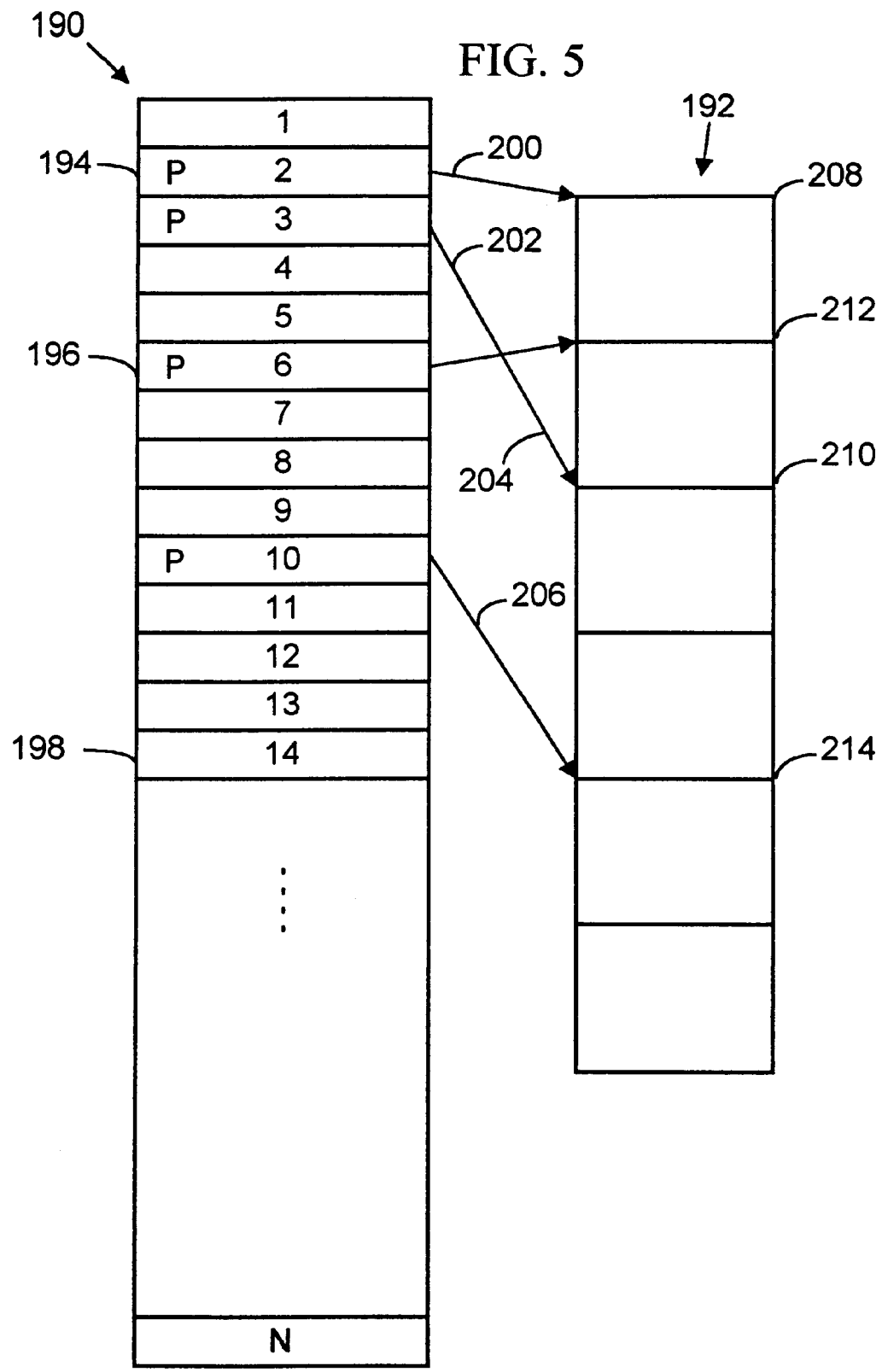

METHOD AND SYSTEM FOR RESTORING THE STATE OF PHYSICAL MEMORY AS THE FOCUS CHANGES AMONG APPLICATION PROGRAMS IN A COMPUTER

FIELD OF THE INVENTION

The invention relates to memory management in a computer, and more specifically relates to a method for controlling the state of physical memory in a multitasking operating system that uses virtual memory to enable concurrently executing programs to share physical memory.

BACKGROUND OF THE INVENTION

The term "virtual memory" refers to a method for allowing several concurrently running application programs to share the physical memory of a computer. The physical memory refers to the main memory of a computer used to execute computer programs and is typically implemented with Random Access Memory (RAM). Multitasking operating systems typically use virtual memory to expand the memory available to each of the application programs executing in the computer. Virtual memory has the effect of making memory appear much larger to applications. To create this effect, a virtual memory manager (VMM) allocates memory from a virtual memory space that is much larger than the size of physical memory. The VMM uses secondary storage space in the computer such as a hard disk to extend the effective size of physical memory. The VMM only loads code and data from secondary storage to physical memory when an application actually needs it, e.g., to process a read or write request.

When a program makes a read or write request to virtual memory, the virtual memory manager determines whether the code or data requested is either located in physical memory or in secondary storage. If it is in physical memory, the virtual memory manager maps the virtual address into a physical address where it is located in physical memory. On the other hand, if the code or data is not in physical memory, the virtual memory manager fetches it from the secondary storage device and places it in physical memory. Thus, the virtual memory manager makes the physical memory appear larger to the application by swapping program code and data in and out of physical memory as needed to satisfy memory requests.

To illustrate the concept of virtual memory, consider an example of an operating system executing on a personal computer with 4 megabytes of physical memory and a hard drive with additional free memory space. The operating system itself might occupy up to a megabyte of the physical memory. If the user wishes to launch a game program occupying 2 Megabytes from the hard drive, then the total memory occupied in physical memory is about 3 Megabytes. Now assume that the game program attempts to load additional code or data files exceeding 1 Megabyte. Under these circumstances there is insufficient physical memory to hold the code and data for the currently executing programs in the computer.

The VMM solves this problem by swapping code and data needed to run the executing programs back and forth between physical memory and the hard drive. For example, if the instructions of a particular piece of code are to be executed, the piece of code must be loaded into physical memory of the computer. Other pieces of code can stay on disk until they are needed. Whenever a piece of code or data is not held in physical memory, the operating system marks its absence by setting (or clearing) a flag associated with that code or data. Then, if an access to that code or data is attempted, the processor will generate a not present interrupt that notifies the operating system of the problem. The operating system then arranges to load the missing code or data into an available area of physical memory and restarts the program that caused the interrupt. The swapping of code and data to and from the hard drive and the interrupts are transparent to the application programs executing in the computer in the sense that the application programs do not process the interrupt nor manage swapping of data back and forth. Rather, the application program only deals with a virtual address space of virtual memory, and the operating system maps requests for virtual memory to physical memory and swaps data back and forth between physical memory and the hard drive.

In a typical virtual memory system, some operating system components are guaranteed access to a portion of physical memory and several other software components contend for the remainder of physical memory. Operating system components that always occupy physical memory include memory resident components of the operating system kernel and a disk cache. The remainder of the physical memory is shared among other software such as dynamically loaded operating system components (DLLs), application program code and data, and dynamically allocated regions of memory such as Direct Memory Access (DMA) buffers and cache regions for the operating system's file system.

The operating system components that always occupy physical memory have a "lock" on a portion of the physical memory. A "lock" is an attribute of a memory management system that commits or reserves a portion of physical memory to a piece of code or data. In many operating systems, it is typical for a lock to be on a portion of physical memory if that memory contains a piece of code that must be able to run at interrupt time or a piece of data that needs to be accessible at interrupt time or that needs to be accessed asynchronously by hardware devices in the computer.

Initially, the operating system allocates virtual memory to the application programs. However, the operating system will not actually allocate physical memory to an application program until that program attempts to access memory. As code executing in the system attempts to access memory allocated to it, the operating system will allocate physical memory until it is filled, and then start to swap portions of physical memory to the hard drive to accommodate memory accesses.

The virtual memory system typically uses a portion of the hard drive, called a swap file, to swap code and data to and from physical memory. The operating system loads program code such as the executable code of an application program (e.g., a .exe file) directly from the hard drive. As an application requests access to program data, the operating system allocates physical memory, and subsequently, swaps this program data to and from physical memory once physical memory is filled up.

At run time, an application can either implicitly or explicitly request additional memory. An implicit request occurs when an application asks the operating system for a resource such as a new window, and the operating system allocates memory as a side effect to responding to the request for the resource. An explicit request occurs when the application directly invokes a function to specifically ask the operating system to allocate extra memory to it. In both cases, the operating system claims memory for resource allocation from virtual address space.

One form of virtual memory in common use today is referred to as paged virtual memory. In a paged virtual memory scheme, the operating system carries out all memory allocation, de-allocation, and swapping operations in units of memory called pages. In a microprocessor compatible with the 386 architecture from Intel Corporation, for example, a memory page is 4K and each memory segment is made up of one or more 4K pages. The Windows® 95 operating system is one example of an operating system that implements a paged virtual memory system.

Terms commonly used to describe a paged virtual memory scheme include paging, page file, and page fault. The term "paging" refers to the process of swapping code or data between physical memory and secondary storage. The term "page file" refers to the swap file maintained in a secondary storage device to hold pages of code and data swapped to and from the physical memory. Finally, the term "page fault" refers to an interrupt generated by a microprocessor indicating that the memory request cannot be satisfied from physical memory because the page containing the requested code or data is not located in physical memory.

The implementation details of any virtual memory system vary depending on the design and memory addressing scheme of the processor. One of the most wide spread processor architectures in the personal computer industry is the 386 architecture from Intel Corp. The basic memory management features of this architecture are used in 486, Pentium, Pentium II, and Pentium Pro microprocessors form Intel Corp. The 386 architecture supports three operating modes: real mode, protected mode, and virtual mode. Real mode refers to a mode used to maintain compatibility with the 8086 line of processors. This mode has a segmented memory architecture that employs four segment registers to address up to 1 Megabyte of memory. Each segment register points to a first byte of a memory segment. The address register stores on offset address to a byte within a memory segment. The processor combines the contents of a segment register with an address register to form a complete address.

In protected mode, the processor uses the contents of the segment register to access an 8 byte area of memory called a descriptor. The segment register contains an index into a table of descriptors. The processor uses the information in the descriptor to form a base address. It then combines an offset address from the application program to the base address to compute a physical memory address. In this mode, the operating system can use any suitable area of physical memory as a segment. The segments of an application need not be contiguous and can have different sizes.

Virtual mode is similar to protected mode in that it uses the same notion of segments, except that a single segment can be 4 Gigabytes instead of only one Megabyte, and it enables the operating system to implement a virtual memory scheme. Like protected mode, a processor in virtual mode uses the contents of a segment register as an index into a descriptor table. The descriptor table specifies the base address of a memory segment. The operating system sets up the base register to point to the first byte of a program's code or data segment. The processor combines a 32 bit offset address to the base address to compute a fmal 32 bit address.

When virtual memory is enabled in the 386 architecture, the processor alters the interpretation of this final 32 bit address to map it into a 32 bit physical address. During initialization, the operating system switches the processor into protected mode and then enables paging. The 32 bit address computed by combining the base address with the offset from the program is an address in virtual memory space.

With paging enabled, the processor maps this address in virtual memory space to an address in physical memory space. FIG. 1 is a diagram illustrating how the processor interprets the 32-bit address from an application. The top 10 bits (31 . . . 22) (see 20 in FIG. 1) are an index into a page table directory (22 in FIG. 1). Part of each 32-bit quantity in a page table directory points to a page table (24 in FIG. 1). The next 10 bits of the original address (20 . . . 12) (see 26 in FIG. 1) are an index into the particular page table. Part of each page table entry (28) points to a page of physical memory. The remaining 12 bits of the virtual address (11 . . . 0) (30 in FIG. 1) form an offset within this page of memory.

The operating system stores the address of the page table directory for the current program in a special processor register called CR3 (32). Each time the operating system switches tasks, it can reload CR3 so that it points to the page directory for the new program. The process of mapping a virtual address into a physical address is performed within the processor. Memory caching techniques ensure that frequently used page table entries are available with no additional memory references.

To fully support the virtual memory scheme, page table entries contain more than just a pointer to a page table or physical address. FIG. 2 shows the contents of a single 32-bit word in both the page table directory and page table entry structures (see items 40 and 42 in FIG. 2). The page table directory and each page table consume one 4 K memory page (1024 entries in each). This allows the entire 4 GB of a program's address space to be properly addressed. The flag bits in the page table directory allow the system to store the page tables themselves on disk in the paging file. Thus, for large programs (for example, a 1-GB program, which will need 256 page table pages), the system will swap page tables as well as program code and data pages in and out of physical memory.

To fully support the virtual memory operations and the 386 memory protection system, the page directory and page table entries include a number of flag bits. The processor itself modifies some of these flags directly. The operating system manages others. As shown in FIG. 2, these flags include the following bits: D, A, U/S, R/W, and P.

Whenever a program modifies the contents of a memory page, the processor sets the corresponding page table dirty bit (the D bit in FIG. 2). This tells the operating system that if it wants to remove the page from memory to free up space, then it must first write the page out to disk to preserve the modifications.

Any reference —read, write, or execute —to a page causes the processor to set the accessed bit (the A bit in FIG. 2) in the corresponding page table entry. The virtual memory manager can use this flag to determine how often a page has been accessed. One way to tell how frequently a page has been accessed is to set and check this bit periodically to determine whether the page has been accessed. The access bit of a page that is used infrequently will not change if the hardware has not set the access bit. Removing that page from memory is probably a better choice than removing a page that was definitely in use during the same time period. The Windows®95 operating system uses an algorithm known as least recently used (LRU) to determine which page to remove from memory. The more recently used a page, the less likely it is to be re-allocated.

The present bit (the P bit) is set to 1 only when the page table or memory page addressed by the table entry is actually present in memory. If a program tries to reference a page or page table that is not present, the processor generates a not-present interrupt and the operating system must arrange to load the page into memory and restart the program that needed the page.

The user/supervisor bit (the U/S bit) is part of the 386's overall protection system. If the U/S bit is set to 0, the memory page is a supervisor page —that is, it is part of the memory of the operating system itself and no user-level program can access the page. Any attempted access causes an interrupt that the operating system must deal with.

The read/write bit (the R/W bit) determines whether a program that is granted access to the corresponding memory page can modify the contents of the page. A value of 1 allows page content modification. A value of 0 prevents any program from modifying the data in the page. Normally, pages containing program code are set up as read-only pages.

The memory addressing scheme described above enables the operating system to implement a virtual memory system. One limitation of modern operating systems is that they implement viral memory in a way that tends to degrade performance of applications when the focus changes in a multitasking operating system. In the context of a multitasking operating system, the focus refers to the state of the application program that is currently active on the display monitor and receiving user input. In other words, the foreground application program has the focus, even if the operating system is letting another process use CPU time.

When an application loses the focus, the virtual memory system tends to swap portions of the application's code and data to the hard drive. This is particularly true of highly interactive applications like games that use a large portion of physical memory when they have the focus and then rarely access memory when they lose the focus.

When this type of application program regains the focus, the motion of objects on the display and the responsiveness of the program to user input appears to stutter as the operating system attempts to reload the necessary code and data into physical memory. This is due to the design of the virtual memory system that causes small portions of the application's code and data to be swapped in from the hard drive as the application attempts to access memory.

Some operating systems, such as the Windows®95 Operating System from Microsoft Corp., implement virtual memory using a LRU algorithm to control swapping of pages to and from physical memory. As a general rule, this virtual memory system gives the pages of the operating system's dynamically loaded components and all of the pages of the application programs equal priority. Thus, if a game application becomes inactive temporarily, the operating system is likely to swap its pages out of physical memory. When the application becomes active again, the motion of objects on the display and responsiveness of the game to user input stutters as the operating system gradually swaps pages back into physical memory.

One way to address this problem is to lock the physical memory allocated to the application so that no other code has access to that portion of physical memory. For example, in the Windows® Operating system, an application can request a page lock for a piece of physical memory. The page lock causes the operating system to commit a portion of physical memory and remove it from the pool of physical memory available to other executing code. This is not an acceptable solution because it can lead to extremely poor system performance where concurrently executing applications need access to physical memory but are unable to get it due to the application's lock on physical memory.

SUMMARY OF THE INVENTION

The invention is a method for improving performance of applications in multitasking operating systems that use virtual memory. The method monitors which application has the focus in a multitasking operating system. The focus refers to the application that is active and currently ready to receive input from the user. When an application loses the focus, the method records the state of the virtual memory system, and specifically, the pieces of code and data associated with the application that were present in physical memory. Later, when the application regains focus, the method reloads the code or data that was previously in physical memory back into physical memory before the application resumes executing.

One implementation of the method is part of an application programming interface that enables applications to control physical memory allocation in an operating system that uses virtual memory to share physical memory. An application can request that the state of its code or data in physical memory be stored when it loses focus and then re-stored when it regains focus. To make this request in this implementation, an application invokes an API function call, specifying an identifier of its main window on the user interface and passing a parameter indicating that the implementation should preserve its state.

In the implementation, a memory monitor monitors for changes in focus among concurrently executing application programs. When the user causes the focus to change, such as by switching to another application's window, the operating system sends a message to the memory monitor. In turn, the memory monitor causes the physical memory manager to identify all units of memory of the application that are currently located in physical memory. The memory monitor saves this state information along with a process identifier of the application.

Continuing to monitor for changes in focus, the memory monitor detects when the application regains the focus. Before application resumes, the memory monitor passes a list of the units of memory that should be present in physical memory to the physical memory manager. The physical memory manager re-loads any units of memory that have been swapped to secondary storage while the application did not have the focus. As part of a paged virtual memory system, the units of memory in this implementation are pages. However, the concepts of the invention apply to other forms of virtual memory systems not based on paging.

The method and API implementation described above have a number of advantages. One advantage is that it tends to prevent page faults from degrading the performance of an application when changes in focus occur. The method ensures that the state of physical memory allocation is restored before the application resumes executing so that page faults are less likely. Since it is likely that an application will attempt to access the same code or data that it had just accessed before losing the focus, restoring the state of physical memory allocation reduces the chances of page faults after an application regains the focus. In addition, it is less likely that page faults will be spread over time, causing the application to stutter. Another advantage is that the method restores the state of physical memory without requiring the application to specifically request access to a piece of its code or data. The method restores the state automatically before the application resumes executing. Additional features and advantages of the invention will become more apparent from the following detailed description and accompanying drawings.

BRIEF DESCRIPTION OF THE DRAWINGS

FIG. 3 is a diagram illustrating a computer system that serves as an operating environment for an implementation of the invention.

FIG. 4 is a diagram showing an implementation of the invention.

FIG. 5 is a diagram illustrating an example of a page table and its relationship to physical memory.

DETAILED DESCRIPTION

Figure 1:
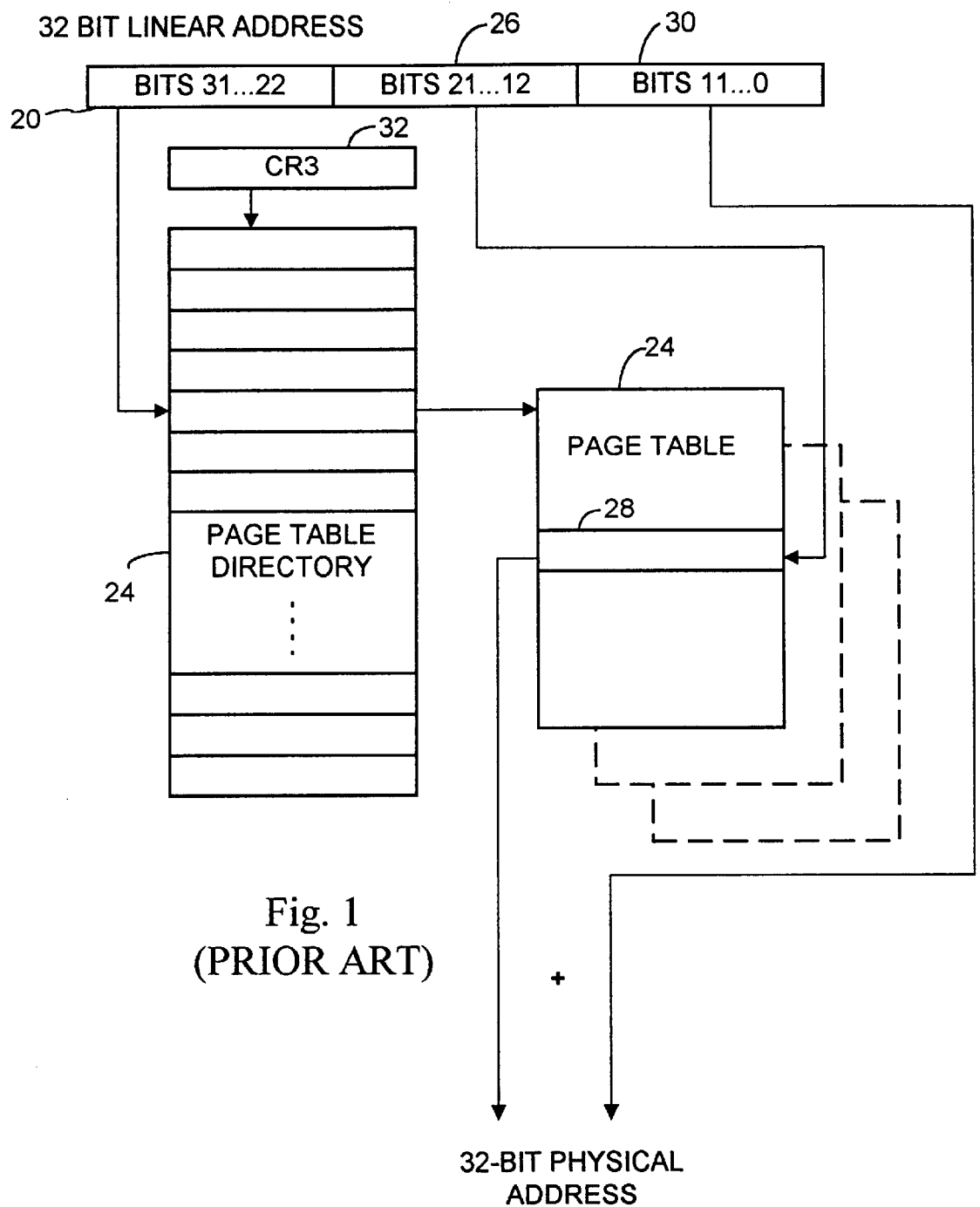
FIG. 1 is a diagram illustrating a virtual memory addressing scheme in the 386 processor architecture.
Figure 2:
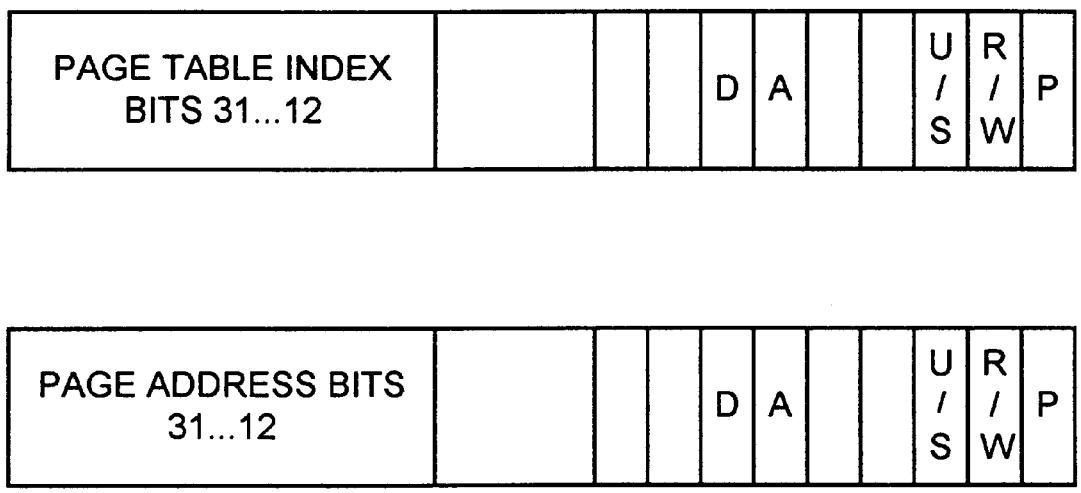
FIG. 2 is a diagram illustrating entries in the page table directory and page table shown in Fig. 1.

The invention is directed toward a method for restoring the state of physical memory as the focus changes among application programs in a computer. In one embodiment, the invention is incorporated in an application programming interface (API) entitled "DirectMemory" for the Windows® 95 Operating System from Microsoft Corporation of Redmond, Washington. Briefly described, the API provides a series of functions or API calls that allow applications to control how the operating system manages access to physical memory.

FIG. 3 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 3 illustrates an example of a computer system that serves as an operating environment for the invention. The computer system includes a personal computer 120, including a processing unit 121, a system memory 122, and a system bus 123 that interconnects various system components including the system memory to the processing unit 121. The system bus may comprise any of several types of bus structures including a memory bus or memory controller, a peripheral bus, and a local bus using a bus architecture such as PCI, VESA, Microchannel, ISA and EISA, to name a few. The system memory includes read only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions (program code such as dynamic link libraries, and executable files), etc. for the personal computer 120. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 125, including an operating system 135, one or more application programs 136, other program modules 137, and program data 138. A user may enter commands and information into the personal computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be a server, a router, a peer device or other common network node, and typically includes many or all of the elements described relative to the personal computer 120, although only a memory storage device 150 has been illustrated in FIG. 3. The logical connections depicted in FIG. 3 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 54 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

One embodiment of the invention is part of an Application Programming Interface that enables applications to control the memory management functions of the Windows® Operating System from Microsoft Corp. The virtual memory manager in this operating system is designed for the 386 processor architecture described in the background section. Specifically, the virtual memory manager implements a paged virtual memory scheme. The operating system manages allocation of virtual and physical memory in 4K pages and manages physical memory allocation using the state information provided in the entries of the page table directory and page tables.

The current implementation is a memory monitor that works in conjunction with the virtual memory manager of the operating system. The memory monitor monitors the operating system for changes in the focus. When an application loses the focus, the memory monitor determines which code and data associated with the application are located in physical memory. The memory monitor saves the state of the physical memory allocation for this application. When the application regains the focus, the memory monitor causes the operating system to reload all of the code or data that was previously in physical memory back into the physical memory before the application starts to execute.

FIG. 4 is a diagram showing an implementation of the invention. The applications (app. 1–3) (161–163) represent concurrently executing application programs in a computer, sharing physical memory of the computer. These applications can control the allocation of physical memory by invoking functions of an API implementation 164. A specific example and accompanying description of the API implementation is provided below.

The API implementation 164 includes a memory monitor 165 that monitors the focus in the operating system. It hooks messages (e.g., message 166) from the operating system indicating that the focus has changed from one application to another. Application programs can specify that they want the state of their physical memory allocation restored when they regain focus by invoking an API function in the API implementation. Specifically, in this API designed for the Windows® 95 Operating System from Microsoft Corp., an application invokes a function in the API implementation and passes a parameter indicating that it wants its physical memory state restored upon regaining focus and another parameter indicating its window handle. The memory monitor 165 uses this window handle to determine when an applications gains focus.

FIG. 4 shows a portion of the virtual memory space 170 allocated to an application to illustrate an example of the state of physical memory allocation of the application. The marked sections (172, 174, 176 and 178) of the virtual memory space represent portions of the application's code or data that currently reside in physical memory. Note that, relative to each other, the marked sections are not necessarily contiguous portions of virtual memory. The units of memory, or pages in this case, that store the code or data in the marked sections can reside at any available location in physical memory.

The memory monitor 165 determines this state information by determining which pages currently reside in physical memory from the page table directory and page table entries. In the example shown in FIG. 4, the page tables associated with the application's code and data reflect that the pages that coincide with the marked sections are currently in physical memory.

The physical memory manager 180 shown in FIG. 4 is a part of the operating system that interacts with the computer hardware to control physical memory allocation. It implements a paged virtual memory scheme and is responsible for allocating physical memory, loading pages into physical memory, and swapping pages between physical memory and secondary storage when necessary to process Not Present interrupts (page faults). As noted above, the physical memory manager in the Windows® 95 operating system implements page swapping using an LRU algorithm.

The physical memory manager 180 maintains state information on the physical memory allocation of each concurrently executing application. The physical memory manager 180 maintains a list of concurrently executing processes 182 and a list of pages of each process that are currently in physical memory (as opposed to secondary storage). Each executing process has a process identifier or PID. In this example, there are three concurrently executing application programs and therefore, the physical memory manager 180 tracks the three PIDs corresponding to these application programs.

In the structure maintained by the physical memory manager 180, each PID is associated with a list of pages currently residing in physical memory. Note in this implementation, there are four sections in the list, each corresponding to the four marked sections 172–178 of virtual memory. For each marked section, there is a corresponding group of pages used to store the code or data in the section.

Using window handles, the memory monitor 165 monitors for changes in focus by intercepting messages from the operating system destined for an application's window. One implementation hooks messages corresponding to user input from the operating system to the application's window (or windows). These messages indicate which application is active and currently responsive to user input. Another implementation uses operating system services, namely a shell hook, to receive notifications about changes in focus from one application to another.

When an application loses the focus, the memory monitor 165 saves the state of physical memory allocation of the application. Specifically, the memory monitor queries the physical memory manager 180 and requests that it return a copy of the page table state for the application that has just lost the focus. The page table state, in this implementation, is a copy of the structure 184 illustrated in FIG. 4. It is important to note that the manner in which the state of an application's physical memory allocation is represented can vary depending on a number of factors including the data structure format chosen by the developer, the type of operating system, and the underlying memory architecture. This implementation is only one example for a paged virtual memory system.

As shown in FIG. 4, the memory monitor 165 retains a copy of the state information 186 identifying a list of pages present in physical memory when the application lost focus. When the application regains the focus, the memory monitor 165 retrieves the state information and instructs the physical memory manager 180 to load each of the pages that were present in physical memory when the application lost the focus.

The memory monitor 165 makes sure that all of the pages that were previously in physical memory are re-loaded before the application resumes execution. The application will resume execution at the point where it left off when it lost the focus. Consider an example in which the address of the instruction where the program resumes execution is the point marked with the arrow 190 in FIG. 4. When the application regains the focus, the memory monitor 165 will load all of the pages associated with sections 172–178, even though the program resumes execution at the instruction stored at virtual address 190. Thus, rather than loading only the pages in proximity to the virtual address 190, the memory monitor 165 ensures that all the memory that was previously allocated is reloaded somewhere in physical memory.

As indicated above, the memory monitor 165 instructs the physical memory manager 180 to re-load pages into physical memory based on the page table state. FIG. 5 is a diagram illustrating an example of a page table 190 and its relationship to physical memory 192. Each entry (e.g., 194, 196, 198) in the page table 190 corresponds to a unit of memory, namely a page. If a page currently resides in physical memory, the present bit (P) in the page table entry is set. A portion of the page table entry is an address that refers to a specific location in physical memory if the page is currently in physical memory. In FIG. 5, the address is represented as pointer to a location in physical memory 192. For example, pointers (200, 202, 204, 206) refer to locations (208, 210, 212, 214) in physical memory 192.

In order to re-load the correct pages, the memory monitor 165 only needs to store a list of the pages with the P bit set.

With this information, it can instruct the physical memory manager 180 to load all pages in the list into physical memory. The memory manager loads these pages in available portions of physical memory. Once re-loaded, the actual location of these pages is likely not the same as it was when the application lost the focus. However, to the application, this does not matter because the state of the virtual memory, as shown in FIG. 4, is the same.

A description of one possible implementation of the API called "DirectMemory" is provided below. An application program can specify that it wants the state of its physical memory allocation restored by invoking the SetCooperativeLevel function and passing the DMSCL_PRESERVESTATE parameter and the window handle of the applications main window.

```
DirectMemory::AddMemoryToGroup
    HRESULT
    DirectMemory::AddMemoryToGroup(dwGroupHandle,dwCount,lplpAddr,
    lpdwSize)
    Purpose
    Adds the specified memory blocks to a previously created group.
    Parameters
        dwGroupHandle
            This is the handle used to identify the previously created group.
        dwCount
            This indicates the number of blocks of memory in the list pointed at by lplpAddr.
        lplpAddr
            This is an array of pointers to the blocks of memory to be added to this group.
        lpdwSize
            This is an array of DWORDS which indicate the length of the blocks of memory
            pointed to by lplpAddr.
    Return Value
        DM_OK                         Operation succeeded.
        DMERR_BADGROUP                This group was not created by CreateGroup.
DirectMemory::CreateGroup
    HRESULT DirectMemory::CreateGroup(dwFlags,lpdwGroupHandle,dwCount,
    lplpAddr,lpdwSize)
    Purpose
    Creates a group that contains sections of memory that should be treated as a single unit for
    purpose of virtual memory management. A group will be paged in, paged out,
    SOFTLOCKed and reference counted as a single piece.
    Parameters
        dwFlags
            DMGROUP_SOFTLOCK
            DMGROUP_PRELOAD
        lpdwGroupHandle
            Points to a DWORD where the new group handle will be returned.
        dwCount
            This is the number of blocks of memory in the list pointed at by lplpAddr.
        lplpAddr
            This is an array of pointers to the blocks of memory to be added to this group as it
            is being created.
        lpdwSize
            This is an array of DWORDS which indicate the length of the blocks of memory
            pointed to by lplpAddr.
    Return Value
        DM_OK                         Operation was a success.
        DMERR_BADDADDRESS             Physical address failed.
DirectMemory::DeleteMemoryFromGroup
    HRESULT DirectMemory::DeleteMemoryFromGroup(dwGroupHandle,dwCount,
    lplpAddr)
    Purpose
    Deletes the specified memory blocks from a previously created group. This call will fail if
    all of the blocks specified are not in the specified group.
    Parameters
        dwGroupHandle
            This is the handle used to identify the previously created group.
        dwCount
            This is the number of blocks of memory in the list pointed at by lplpAddr.
        lplpAddr
            This is an array of pointers to the blocks of memory to be added to this group.
    Return
        DM_OK                         Operation succeeded.
```

-continued

DMERR_BADGROUP  This group was not created by CreateGroup.
  DMERR_BADBLOCKS  Some of the blocks specified are not part of
  this group.
DirectMemory::DestroyGroup
 HRESULT DirectMemory::DestroyGroup(dwGroupHandle)
 Purpose
 This function destroys a previously created group. All of the pages that are part of this
 group are freed. It is not necessary to delete all of the pages from a group before
 destroying it.
 Parameters
  dwGroupHandle
   Handle of group that was previously created by CreateGroup.
 Return Value
  DM_OK  Operation was a success.
  DMERR_BADGROUP  This group handle was not created by
  CreateGroup.
DirectMemory::GetMaxPhysicalMemory
 HRESULT DirectMemory::GetMaxPhysicalMemory(dwFlags,lpdwNumPages)
 Purpose
 Returns to the application the number of pages of physical memory available to an
 application in the best case scenario.
 Parameters
  dwFlags
   DMGMPM_EXCLUSIVEMODE The Physical memory pages for the
   application when it has focus.
   DMGMPM_SHARED  The physical memory pages for the
   application when it does not have focus.
  lpdwNumPages
   The number of 4K pages of physical memory.
 Return Value
  DM_OK  Operation was successful.
DirectMemory::GetProcessWorkingSetSize
 HRESULT DirectMemory::GetPorcessWorkingSetSize(dwFlags,lpdwNumPages)
 Purpose
 This API returns what the operating system considers an application's current working set
 needs to be.
 Parameters
  dwFlags
   DMSPWS_EXCLUSIVEMODE The working set of the application when it
   has focus.
   DMSPWS_SHARED  The working set of the application when it
   does not have focus.
  lpdwNumPages
   Points to a DWORD where the number of 4K pages of physical memory that this
   application has reserved for it.
 Return Value
  DM_OK  Operation was successful.
  DMERR_OUTOFMEMORY  Requested working set size is beyond the
  physical memory limitations of this system. The working set for the application was
  not changed.
DirectMemory::SetCooperativeLevel
 HRESULT DirectMemory::SetCooperativeLevel(hWnd,dwFlags)
 Purpose
 To specify the way this application wishes to use DirectMemory and to provide the hWnd
 that DirectMemory should use to track the application's focus.
 Parameters
  hWnd
   This is the hWnd that represents the application focus.
  dwFlags
   DMSCL_PRESERVESTATE If this flag is set the memory state of the
   application is preserved when the application loses focus and is restored when the
   application regains focus before execution begins.
   DMSCL_EXCLUSIVEMODE If this flag is set the LRU status of pages
   owned by an application are marked as NOT USED when the application loses
   focus. any SOFTLOCKS are released. SOFTLOCKS will be restored when the
   application regains focus.
   DMSCL_SHARED  If this flag is set the applications
   SHAREDSOFTLOCKS are not released when it loses focus. There is less memory
   available to an application through SOFTLOCKS when it does not have the focus.
   See Lock for ways to specify SOFTLOCKS that survive focus loss.
 Return Value
  DM_OK  Operation was a success.
  DMERR_BADHWND  The hwnd specified is invalid or of an
  incorrect type.
DirectMemory::SetProcessWorkingSetSize
 HRESULT DirectMemory::SetProcessWorkingSetSize(dwFlags,dwNumPages)
 Purpose
 This API allows an application to communicate its working set needs to the operating
 system so that amount of physical memory can be kept free for it.

-continued

```
    Parameters
        dwFlags
            DMSPWS_EXCLUSIVEMODE    The working set of the application when it
            has focus.
            DMSPWS_SHARED           The working set of the application when it
            does not have the focus.
        dwNumPages
            The number of 4K pages of memory that this application needs to have to avoid
            thrashing in normal usage scenarios.
    Return Value
        DM_OK                       Operation was successful.
        DMERR_OUTOFMEMORY           Request working set size is beyond the
        physical memory limitations of this system. The working set for the application was
        not changed.
DirectMemory::Lock
    HRESULT Lock(dwFlags,lpAddr,dwSize)
    Purpose
    This API specifies the segment of memory that is to be tracked by DirectMemory. The
    segment will either be added to the SOFTLOCK pool or the MOSTRECENTLYUSED
    pool. The SOFTLOCK pool is restored and page locked when the application regains
    focus. The MOSTRECENTLYUSED pool is restored when the application gains focus.
    This call can fail if the amount of physical memory requested exceeds the application
    physical memory limitations specified by the end-user.
    SOFTLOCK requests are higher priority than MOSTRECENTLYUSED requests.
    SOFTLOCK's can be overridden when the operating system requires memory.
    SOFTLOCK memory should not be used for DMA or Interrupt Service Routines.
    Parameters
        dwFlags
            DMLOCK_SOFTLOCK         Page lock this memory when the
            application has focus.
            DMLOCK_SHAREDSOFTLOCK   Page lock this memory even when
            the application does no have the focus. All other rules for SOFTLOCK's apply,
            this memory may still be reclaimed by the operating system. The amount of
            memory that can be SOFTLOCKed by an application that does not have the focus
            is considerably more constrained. The application that has focus has priority.
            DMLOCK_MOSTRECENTLYUSED
        lpAddr
            Pointer to the start of the memory to be affected. This pointer is rounded down to
            the nearest 4K page boundary on 386 Architecture systems. The dwSize parameter
            is rounded up by the same amount.
        dwSize
            Length of the memory affected. The dwSize parameter is rounded up to the
            nearest 4K page.
    Return Values
        DM_OK                       Operation was a success.
        DMERR_OUTOFMEMORY           No physical memory left to satisfy this
        request.
DirectMemory::Unlock
    HRESULT DirectMemory::Unlock(lpAddr)
    Purpose
    To release a SOFTLOCK or MOSTRECENTLYUSED designation on a section of
    memory that was previously locked.
    Parameters
        lpAddr
            Pointer that was previously passed to Lock.
    Return Values
        DM_OK                       Operation was a success.
        DMERR_NOTLOCKED             Physical address was never locked.
```

While we have described our invention with respect to a specific implementation, it is important to emphasize that the implementation can vary without departing from the scope of the invention. The current implementation is designed for a virtual memory management system that swaps code and data to and from physical memory in pages. However, the invention can also apply to operating systems that use alternative schemes for swapping units of code and data. The state of physical memory allocation in a virtual memory system can be stored in a variety of different formats, depending on the developer's design choice for the specific format of the data structure for storing the state of physical memory allocation, the design of the physical memory manager in the operating system, and the underlying memory architecture of the processor.

In the implementation described above, the method applies to a multi-tasking operating system where changes in focus can be monitored by monitoring for input in a graphical user interface such as a window. The change in focus can be triggered by non-graphical input such as when the user presses a control key or set of keys to change the focus. The change in focus can also be initiated by the operating system in response to other events such as an interrupt generated by a peripheral.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A method for restoring a state of physical memory allocation in a computer as focus changes among concurrently executing application programs, the method comprising:

monitoring the focus of a multitasking operating system;

when an application loses the focus, saving state information identifying portions of code or data of the application that are in physical memory; and when the application regains the focus, using the state information to re-load the portions of code or data of the application from a secondary storage back into the physical memory before the application resumes execution.

2. The method of claim 1 wherein:

the state information comprises page table state;

the step of saving the state information includes saving a list of pages used to store the portions of code and data in physical memory when the application lost the focus; and the step of using the state information to re-load the portions of code and data includes loading the list of pages from the secondary storage to the physical memory.

3. The method of claim 1 wherein the monitoring step includes:

monitoring user input to graphical user interfaces of the concurrently executing application programs to determine when the focus changes.

4. The method of claim 1 further including:

in response to an API function call from the application to preserve state of physical memory allocation, performing the steps of claim 1.

5. The method of claim 1 further including:

repeating the steps of claim 1 for another concurrently executing application program.

6. The method of claim 1 further including:

loading code or data of the application into physical memory in units of memory to satisfy memory requests from the application;

swapping the units between physical memory and secondary storage to enable the concurrently executing applications to share physical memory;

when the application loses the focus, identifying the units in physical memory; and when the application regains the focus, instructing a computer to re-load units among the identified units that have been swapped to secondary storage.

7. The method of claim 6 wherein the units of memory are pages.

8. The method of claim 6 wherein the swapping step includes swapping units from physical memory to secondary storage in a least recently used order.

9. A computer-readable medium having instructions for performing the steps of claim 1.

10. In a multi-tasking operating system, a virtual memory system comprising:

a physical memory manager for allocating portions of physical memory, and for swapping sections of code and data of concurrently executing application programs to and from a secondary storage to enable the concurrently executing application programs to share physical memory; and a memory monitor for monitoring focus in the operating system, for saving state information identifying portions of code or data of an application that are located in physical memory when a change in focus occurs, and for using the state information to re-load, into physical memory, portions of the code or data swapped to the secondary storage when the application re-gains the focus.

11. The virtual memory system of claim 10 wherein the physical memory manager allocates the portions of physical memory in pages.

12. The virtual memory system of claim 10 wherein the memory monitor is operable to monitor for changes in focus by monitoring user input to graphical user interfaces of the concurrently executing application programs to determine when a user has directed input to a different application program.

13. The virtual memory management system of claim 10 further including:

an API implementation having an API function call that enables an application to select to have the state information re-stored when the application regains the focus.

14. The virtual memory management system of claim 10 wherein the physical memory manager swaps units of memory that store sections of code and data of concurrently executing application programs to and from secondary storage to enable the concurrently executing application programs to share physical memory; and wherein the state information includes a list identifying units of memory used to store code or data in physical memory when a change in focus occurs.

15. The virtual memory manager of claim 14 wherein the physical memory manager is responsive to the memory monitor to identify units of memory in the list that have been swapped to secondary storage while the application did not have the focus.

16. The virtual memory manger of claim 10 wherein the memory monitor is operable to store state information for two or more concurrently executing application programs, where the state information identifies the state of physical memory allocation when the concurrently executing application programs lost the focus.

17. An application programming interface on a computer readable medium having instructions for restoring a state of physical memory allocation in a computer as focus changes among concurrently executing application programs, the interface comprising instructions for:

monitoring the focus of a multitasking operating system;

when an application loses the focus, saving state information identifying portions of code or data of the application that are in physical memory; and when the application regains the focus, using the state information to re-load the portions of code or data of the application from a secondary storage back into the physical memory before the application resumes execution.

18. The interface of claim 17 further including instructions for:

receiving an API function call from the application in which the application requests the interface to preserve the state information; and creating a data structure to store the state information when the application loses the focus.

19. The interface of claim 17 further including instructions for:

invoking a physical memory manager to identify a list of units of memory associated with the application program and present in physical memory when the application loses focus; and invoking the physical memory manager to load the units of memory, if not already present in physical memory, before the application resumes execution after regaining the focus.

* * * * *